Feb. 15, 1966  P. C. R. FERNBERG  3,235,297
FASTENERS
Filed Aug. 27, 1963
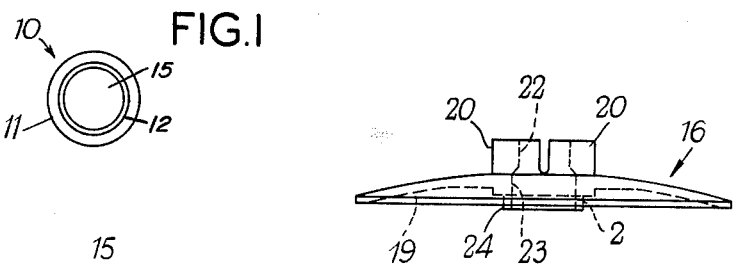
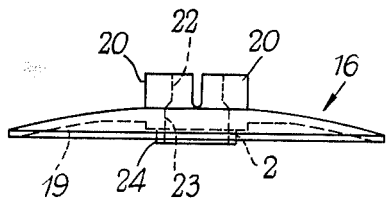
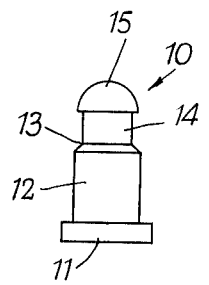
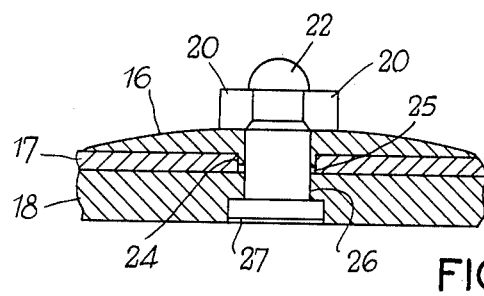
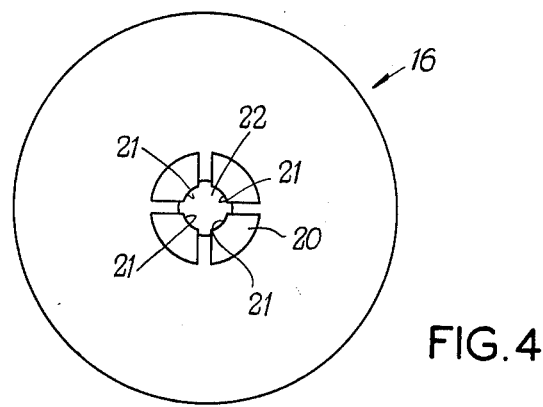
INVENTOR:
PAUL CARL ROGER FERNBERG,
BY Gordon Wellman
ATT'Y United States Patent Office 3,235,297
Patented Feb. 15, 1966

3,235,297
FASTENERS
Paul Carl Roger Fernberg, Farnham Common, England, assignor to United-Carr Incorporated, a corporation of Delaware
Filed Aug. 27, 1963, Ser. No. 305,000
Claims priority, application Great Britain, Sept. 4, 1962, 33,870/62
2 Claims. (Cl. 287—101)

The present invention relates to an improved two-part fastener and to an assembly comprising two apertured members secured together in rotational relationship by means of the said fastener.

According to the invention there is provided a two-part fastener for securing two apertured members together for relative rotation and comprising a pivot pin and a resilient centrally apertured cap, the pin having a head, a shank, a nose and a neck portion of smaller cross-section than the nose joining the shank and nose and the cap having a number of lugs which overhang the central aperture, whereby the pin may be inserted through the apertured members so that the nose, the neck and a portion of the shank extend from one side of the apertured members, the head is engaged against the opposite side of the apertured members and the cap may be forced over the nose of the pin so that the overhanging lugs embrace the neck and engage beneath the nose.

A preferred form of the invention will now be described with reference to the accompanying drawings, in which:

FIGURES 1 and 2 are respectively a plan and elevation of a fastener according to the invention, FIGURES 3 and 4 are respectively an elevation and plan of a cap, and FIGURE 5 is an elevation, partly in section, of an assembly according to the invention.

In FIGURES 1 and 2 a pivot pin is indicated generally at 10.

The pin 10 is formed from any suitable material such as synthetic plastics and is shaped so as to be circular on any transverse section therethrough and has a head 11, a shank 12, a frusto-conical shoulder 13 running into a neck 14 of reduced cross-sectional area, and a hemispherical nose 15.

The head 11 is of greater diameter than the shank 12 which is approximately of the same diameter as the nose 15.

The pin 10 is used in co-operation with a resilient circular cap, which is indicated generally at 16 in FIGURES 3 and 4, to secure an apertured lever arm 18 to a base plate 17 in the manner shown in FIGURE 5.

The resilient cap 16 has a dished undersurface 19 and a central aperture 23 which is surrounded on the upper surface of the cap by four equi-angularly spaced overhanging lugs 20. Each lug has an inner part-cylindrical wall 21 and the walls 21 co-operate to form a gapped bore 22 of slightly smaller diameter than the nose 15 of the pin 10.

A flange 24 is formed around the edge of the aperture 23 on the undersurface 19 of the cap.

The plate 17 has a circular aperture 25 such that the flange 24 will seat therein and the lever arm 18 has an aperture 26 which is stepped to provide a recess 27.

In order to make the assembly shown in FIGURE 5 the plate 17 is brought up to the lever arm 18 so that the apertures 25 and 26 are aligned, the pin 10 is pressed nose first through the apertures so that the head 11 seats in the recess 27 and the cap 16 is then pressed down over the nose 15 of the pin into the position shown.

As the cap 16 is pressed home the nose 15 of the pin 10 enters the bore 22 and forces the lugs 20 apart. The cap 16 is then pressed against the plate 17 until the dished undersurface 19 is flattened thereby allowing the nose of the pin to pass through the lugs 20 which snap back into engagement around the neck 14 of the pin and under the nose 15.

When the assembly is complete the flange 24 on the cap seats in the aperture 25 in the plate and the cap is flattened resiliently against the upper surface of the plate. Thus the lever arm 18 is held securely to the plate 17 and is free to rotate relative to the plate against a frictional force which is determined by the resilience of the cap 16 and the the extent to which it is flattened against the plate.

It will be seen therefore that an effective method is provided whereby two apertured members may be secured together so that they may be relatively rotated against a frictional force which can be varied to suit the requirements of a particular assembly.

What I claim is:

1. An installation comprising in combination a plurality of apertured members secured together by a fastener to provide for relative rotation of at least one of said members, said fastener including a pivot pin and a resilient cap, the pin having a head, a shank, a nose and a neck portion of smaller cross-section than the nose joining the shank and nose, and the cap comprising an apertured disc having a concavely dished undersurface and an upstanding tubular portion on which are a number of lugs which overhang the aperture, said pin being inserted through the apertured members so that the head is engaged against a surface of one of said members, and the nose, the neck and a portion of the shank extend from the opposite side of the remaining members, said cap having been forced over the nose of said pin so that the disc is forced against an opposite surface of one of said remaining members and the overhanging lugs are in snapped engagement beneath the nose of said pin, said cap providing for controlled frictional engagement of said members to allow for relative rotation of one of said members about a portion of the shank of said pin.

2. A two-part fastener for securing two apertured members together for relative rotation comprising a pivot pin and a resilient centrally apertured cap, said pin having a head, a shank, a nose, and a neck portion of smaller cross-section than the nose joining the shank and nose, and the cap having a number of lugs which overhang the central aperture, whereby the pin may be inserted through the apertured members so that the nose, the neck, and a portion of the shank extend from one side of the apertured members, and the head is engaged against the opposite side of the apertured members, and the cap may be forced over the nose of the pin so that the overhanging lugs embrace the neck and engage beneath the nose, said cap having a dished undersurface to provide for controlled frictional engagement between said members and a flange around the under edge of the central aperture therein, whereby said flange may be located in the aperture in one of said members to be secured to act as a bearing during relative rotation of said members.

References Cited by the Examiner
UNITED STATES PATENTS

| 2,921,819 | 1/1960 | Rifkin | 24—211 X |
| 2,941,270 | 6/1960 | Long | 24—217 |
| 3,049,777 | 8/1962 | Lewin | 24—213 |
| 3,112,547 | 12/1963 | Poe | 24—211 |

FOREIGN PATENTS

| 1,182,947 | 1/1959 | France. |
| 566,446 | 12/1944 | Great Britain. |

WILLIAM FELDMAN, Primary Examiner.
EDWARD C. ALLEN, DONLEY J. STOCKING,
Examiners.